United States Patent [19]
Takatsuki

Patent No.: US 6,917,477 B2
Date of Patent: Jul. 12, 2005

(54) TWO-GROUP ZOOM LENS (75) Inventor: Akiko Takatsuki, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/766,822

(22) Filed: Jan. 30, 2004

(65) Prior Publication Data

US 2004/0184161 A1 Sep. 23, 2004

(30) Foreign Application Priority Data

Feb. 5, 2003 (JP) ........................................ 2003-028494

(51) Int. Cl.$^7$ ............................................ G02B 15/14
(52) U.S. Cl. ...................................... 359/691; 359/680
(58) Field of Search ......................... 359/691, 680–682, 359/683, 684–685

(56) References Cited

U.S. PATENT DOCUMENTS

| 6,169,635 B1 | * | 1/2001 | Ozaki et al. | 359/691 |
| 2002/0126393 A1 | | 9/2002 | Nasu et al. | 359/680 |
| 2003/0030918 A1 | * | 2/2003 | Murayama | 359/691 |

FOREIGN PATENT DOCUMENTS

| JP | 58-132207 | * | 8/1983 |
| JP | 2002-196235 | | 7/2002 |
| JP | 2002-207166 | | 7/2002 |
| JP | 2002-244038 | | 8/2002 |

* cited by examiner

Primary Examiner—Jordan M. Schwartz
(74) Attorney, Agent, or Firm—Arnold International; Jon W. Henry; Bruce Y. Arnold (57) ABSTRACT A compact two-group zoom lens that corrects aberrations in the visible and the near infrared regions and that provides a comparatively high zoom ratio includes, in order from the object side, a first lens group of negative refractive power and a second lens group of positive refractive power. The first lens group includes, in order from the object side, first and second negative meniscus lens elements having convex surfaces on the object side, a biconcave lens element, and a positive lens element. The second lens group includes, in order from the object side, a positive lens component which may be a lens element, a negative/positive doublet component, and a negative lens component which may be a lens element. Aspheric lens surfaces are disclosed. Certain conditions are satisfied to control aberrations in both the visible and the near infrared and to ensure a sufficient back focus distance.

20 Claims, 5 Drawing Sheets

Spherical Aberration
Fig. 2A

Astigmatism
Fig. 2B

Distortion
Fig. 2C

Spherical Aberration
Fig. 3A

Astigmatism
Fig. 3B

Distortion
Fig. 3C

Spherical Aberration
Fig. 4A

Astigmatism
Fig. 4B

Distortion
Fig. 4C

Spherical Aberration
Fig. 5A

Astigmatism
Fig. 5B

Distortion
Fig. 5C

Spherical Aberration
Fig. 6A

Astigmatism
Fig. 6B

Distortion
Fig. 6C

Spherical Aberration
Fig. 7A

Astigmatism
Fig. 7B

Distortion
Fig. 7C

Spherical Aberration
Fig. 8A

Astigmatism
Fig. 8B

Distortion
Fig. 8C

Spherical Aberration
Fig. 9A

Astigmatism
Fig. 9B

Distortion
Fig. 9C

TWO-GROUP ZOOM LENS

Cameras for both day and night use have been developed for surveillance imaging. Additionally, the demand for lenses that operate in both the visible light region and the near infrared region for use both during the day and at night has been increasing. Although many zoom lenses have been designed for use in the visible light region, conventional zoom lenses especially designed for use in the visible region generate substantial chromatic aberrations in the near infrared region, which cause images to not be clearly focused when imaging at night using the near infrared region.

Zoom lenses for use in both the visual region and in the near infrared region are described in Japanese Laid-Open Patent Application 2002-196235, Japanese Laid-Open Patent Application 2002-207166, and Japanese Laid-Open Patent Application 2002-244038. The zoom lenses described in these applications are formed with only two lens groups, are relatively compact, and provide a zoom ratio of about 2.2. However, there is a demand for a zoom lens with a higher zoom ratio and that remains compact.

BRIEF SUMMARY OF THE INVENTION

The present invention is a compact, two-group zoom lens that favorably corrects aberrations in both the visible region and the near infrared region and provides comparatively bright imaging while providing a higher zoom ratio than has conventionally been available. The present invention is particularly suited for surveillance imaging.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1A:
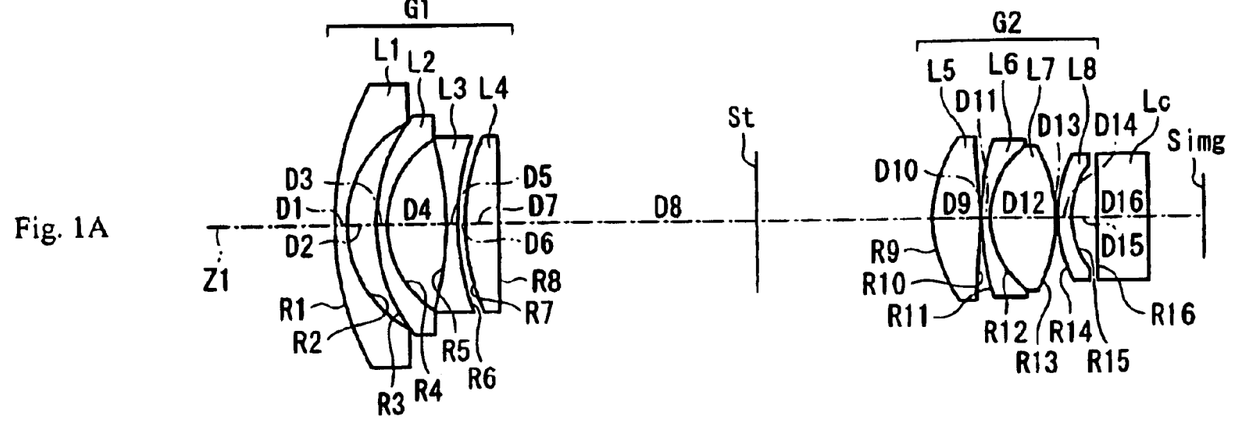
FIGS. 1A–1B show cross-sectional views of Embodiment 1 of the zoom lens of the present invention at the wide-angle end and at the telephoto end, respectively.
Figure 1B:
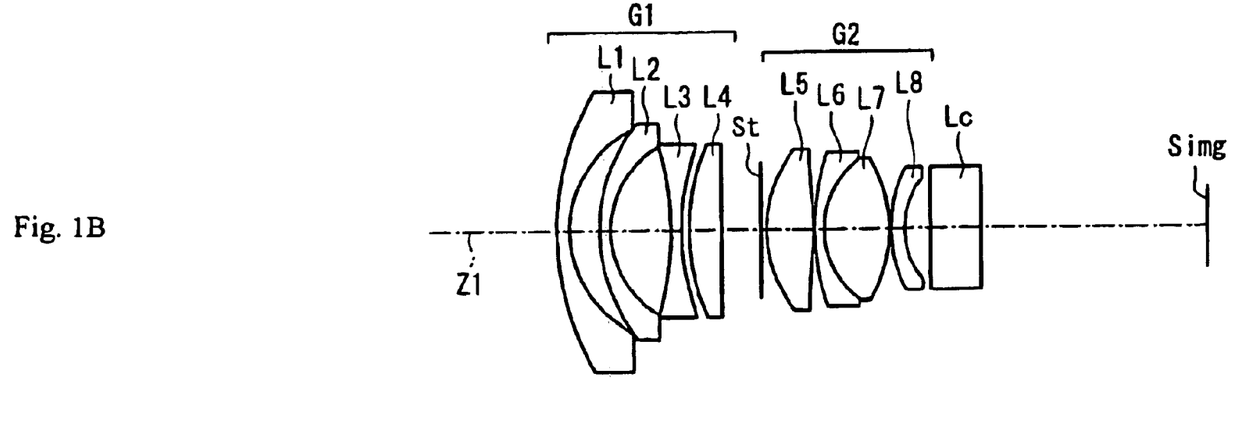

A general description of the two-group zoom lens of the present invention that pertains to all four embodiments of the invention will first be described with reference to FIGS. 1A–1B that show Embodiment 1. In FIGS. 1A–1B, lens elements are referenced by the letter L followed by a number denoting their order from the object side of the zoom lens along the optical axis Z1, from L1 to L8. Similarly, radii of curvature of the surfaces of various optical elements, including the lens surfaces, are referenced by the letter R followed by a number denoting their order from the object side of the zoom lens, from R1 to R16. The on-axis surface spacings along the optical axis Z1 of various optical surfaces are referenced by the letter D followed by a number denoting their order from the object side of the zoom lens, from D1 to D16. In the same manner, the two lens groups are labeled G1 and G2 in order from the object side of the zoom lens and the lens components belonging to each lens group are indicated by the brackets adjacent the labels G1 and G2.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is used herein to define an assembly of one or more lens components that are fixed or are movable as a single unit.

As shown in FIGS. 1A–1B, a diaphragm stop St that controls the amount of light that passes through the zoom lens is included between the lens groups G1 and G2. Also as shown in FIGS. 1A–1B, a cover glass Lc is arranged between the second lens group G2 and the image plane, denoted as Simg, to protect a detecting surface of an image pickup device, such as a CCD (Charge Coupled Device) or CMOS (Complementary Metal Oxide Semiconductor) (not shown), that is arranged at the image plane Simg.

In order to improve imaging, lens surfaces may be aspheric lens surfaces. The lens surfaces that are aspheric are defined using the following equation:

$$Z=[(Y^2/R)/\{1+(1-K\cdot Y^2/R^2)^{1/2}\}]+ A_4Y^4+A_6Y^6+A_8Y^8+A_{10}Y^{10} \quad \text{(Equation A)}$$

where

Z is the length (in mm) of a line drawn from a point on the aspheric surface at a distance Y from the optical axis to the tangential plane of the aspheric surface vertex, R is the radius of curvature (in mm) of the aspheric surface on the optical axis, Y is the distance (in mm) from the optical axis, K is the eccentricity, and $A_4, A_6, A_8$, and $A_{10}$ are the 4th, 6th, 8th, and 10th aspheric coefficients.

The zoom lens of the present invention is designed for use in both the visible light region and the near infrared region, and it may be mounted in a surveillance camera, or in similar imaging systems, for both day and night use.

In the following descriptions, references will be frequently made to a "lens element." However, as set forth above, it is understood that numerous of the lens elements described below are also lens components and may be replaced by lens components that include more than one lens element.

As shown in FIGS. 1A–1B, the two-group zoom lens of the present invention includes, in order from the object side, a first lens group G1 having negative refractive power and a second lens group G2 having positive refractive power. When the negative refractive power of the first lens group G1 is made stronger in order to realize a wide-angle view, the radius of curvature of a negative lens element of the first lens group G1 becomes smaller, which makes manufacturing the lens element surfaces more prone to manufacturing errors. Therefore, in the zoom lens of the present invention, three negative lens elements on the object side of the first lens group G1 are used to disperse the refractive power required in the first lens group G1, so that the first lens group can have strong negative power without requiring the radius of curvature of any one lens surface of a lens element of the first lens group to be too small.

The first lens group G1 includes, for example, in order from the object side, a first lens element L1 of negative refractive power and a meniscus shape with its convex surface on the object side, a second lens element L2 of negative refractive power and a meniscus shape with its convex surface on the object side, a third lens element L3 of negative refractive power, and a fourth lens element L4 of positive refractive power.

The two-group zoom lens satisfies the following condition:

$$-3.4 < f1/fw < -3.0 \quad \text{Condition (1)}$$

where f1 is the focal length of the first lens group G1, and fw is the focal length of the two-group zoom lens at the wide-angle end.

When the ratio of Condition (1) is smaller than the lower limit of Condition (1), the negative refractive power of the first lens group G1 becomes too strong, and the spherical aberration becomes difficult to correct. When the ratio of Condition (1) is larger than the upper limit of Condition (1), the zoom lens does not have an adequate back focus distance.

The second lens group G2 includes, for example, in order from the object side, a first lens element L5 of positive refractive power, a lens component that includes, in order from the object side, a second lens element L6 of negative refractive power that is intimately bonded to a third lens element L7, and a fourth lens element L8 of negative refractive power and a meniscus shape with its convex surface on the object side. The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lenses together, the latter being commonly referred to as a "cemented" lens element arrangement. The lens component that includes lens elements L6 and L7 may have positive refractive power as a whole.

It is desirable that at least one lens surface of at least one lens element of the second lens group G2 be aspheric. For example, it is desirable that both lens surfaces of the first lens element L5 of the second lens group G2 be aspheric.

Further, the image-side surface of the third lens element L7 of the second lens group G2 may also be aspheric.

The first lens element L5 of the second lens group G2 has, for example, a biconvex shape near the optical axis. The second lens element L6 of the second lens group G2 has, for example, a meniscus shape with it convex surface on the object side, and the third lens element L7 of the second lens group G2 has, for example, a biconvex shape.

The two-group zoom lens of the present invention prevents an increase in the outer diameter of each lens element within the second lens group G2 by constructing the second lens group G2 with an arrangement of, in order from the object side, a lens element L5 of positive refractive power, a lens component that includes lens elements L6 and L7, and a lens element L8 of negative refractive power and a meniscus shape.

The zoom lens of the present invention is capable of favorably correcting longitudinal chromatic aberration by including, in the second lens group G2, a lens component with intimately bonded (i.e., cemented, for example) lens elements. If the radius of curvature of the intimately bonded surfaces becomes too small, bonding the lens elements together becomes more subject to manufacturing errors. Therefore, the negative refractive power in the second lens group G2 is distributed between the second lens element L6 and the fourth lens element L8 in this zoom lens, which prevents the radius of curvature of the intimately bonded surfaces from becoming too small and thus avoids manufacturing errors. At the same time, this makes the spherical aberration at the telephoto end easier to correct.

Further, in the zoom lens of the present invention, spherical aberration can be corrected sufficiently to cover the entire range of zoom by arranging at least one aspherical lens surface where the light rays in the second lens group G2 are farthest from the optical axis. Additionally, using at least one aspherical lens surface helps reduce the number of lens elements required for the desired correction of aberrations.

The two-group zoom lens also satisfies the following Conditions (2) and (3) which relate to the second lens group G2:

$$-1.6 < MT < -1.4 \quad \text{Condition (2)}$$

$$60 < \bar{\nu}(G2+) \quad \text{Condition (3)}$$

where

MT is the lateral magnification of the second lens group G2 at the telephoto end of the zoom range of the zoom lens, and $\bar{\nu}(G2+)$ is the average of the Abbe numbers of the materials of the lens elements of the second lens group G2 that have positive refractive power.

With regard to Condition (2), when the upper limit is not satisfied, it becomes difficult to adequately correct fluctuations of aberrations during zooming. When the lower limit of Condition (2) is not satisfied, distortion at the wide-angle end becomes excessive.

With regard to Condition (3), when Condition (3) is not satisfied, the longitudinal chromatic aberration of the zoom lens becomes excessive. By selecting appropriate optical glass material so that Condition (3) is satisfied, the longitudinal chromatic aberration can be favorably corrected, especially in the visible and the near infrared regions, so that a zoom lens that is particularly well suited for use in both the visible and the near infrared regions can be realized.

By the first lens group from the object side having negative refractive power and the second lens group having positive refractive power, and by arranging the lens elements of the two lens groups so as to satisfy Conditions (1) and (2) above, a zoom lens having high performance over the entire range of zoom and with a high zoom ratio can be obtained even though only two lens groups are used, and with each lens group including relatively few lens elements. Further, by selecting the lens materials, preferably glass, of the positive lens elements of the second lens group so as to satisfy Condition (3), longitudinal chromatic aberration can be corrected in both the visible and the near infrared regions. Thus, a two-group zoom lens can be provided that is compact, has a higher zoom ratio than previously available, and satisfactorily corrects aberrations in both the visible and the near infrared regions.

Embodiments 1–4 of the present invention will now be individually described with further reference to the drawings.

EMBODIMENT 1

Table 1 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each lens element for Embodiment 1.

TABLE 1

| # | R | D | $N_d$ | $v_d$ |
|---|---|---|---|---|
| 1 | 23.04 | 1.00 | 1.77250 | 49.6 |
| 2 | 9.26 | 2.37 | | |
| 3 | 13.94 | 0.90 | 1.75500 | 52.3 |
| 4 | 8.00 | 4.78 | | |
| 5 | −25.39 | 0.90 | 1.71299 | 53.8 |
| 6 | 20.12 | 0.59 | | |
| 7 | 17.25 | 2.64 | 1.84665 | 23.8 |
| 8 | 1107.40 | D8 (variable) | | |
| 9* | 9.87 | 3.76 | 1.56867 | 58.2 |
| 10* | −27.77 | 0.10 | | |
| 11 | 19.11 | 0.80 | 1.80609 | 33.3 |
| 12 | 7.42 | 5.12 | 1.49700 | 81.5 |
| 13 | −12.13 | 0.10 | | |
| 14 | 11.21 | 1.10 | 1.80517 | 25.4 |
| 15 | 6.63 | 2.00 | | |
| 16 | ∞ | 4.00 | 1.51680 | 64.2 |

The lens surfaces with a * to the right of the surface number in Table 1 are aspheric lens surfaces, and the aspheric surface shape of these lens elements is defined using Equation (A) above.

Table 2 below lists the values of the constants K, $A_4$, $A_6$, $A_8$, and $A_{10}$ used in Equation (A) above for each of the aspheric surfaces indicated in Table 1. Aspheric coefficients that are not present in Table 2 are zero. An "E" in the data indicates that the number following the "E" is the exponent to the base 10. For example, "1.0E-02" represents the number $1.0 \times 10^{-2}$.

TABLE 2

| # | K | $A_4$ | $A_6$ | $A_8$ | $A_{10}$ |
|---|---|---|---|---|---|
| 9 | −0.29736 | 0.36802E−4 | 0.10640E−5 | 0.23457E−7 | −0.80570E−9 |
| 10 | 1.69840 | 0.30163E−3 | 0.70767E−7 | 0.40580E−7 | −0.12889E−8 |

In the zoom lens of Embodiment 1, both the first lens group G1 and the second lens group G2 move during zooming. Therefore, the on-axis spacing D8 between the two lens groups changes with zooming. With zooming, the focal length, the back focus distance, and the f-number of the zoom lens also change. The back focus distance is defined as the on-axis distance between the image-side surface of the cover glass Lc and the image plane Simg, as shown in FIGS. 1A–1B. Table 3 below lists the values of the variable D8 (in mm), the f-number $F_{NO}$, and the back focus distance Bf (in mm) at the wide-angle end (f=2.79 mm) and the telephoto end (f=13.17 mm).

TABLE 3

| f | D8 | $F_{NO}$ | Bf |
|---|---|---|---|
| 2.79 | 34.58 | 1.37 | 4.30 |
| 13.17 | 3.61 | 3.13 | 17.78 |

The zoom lens of Embodiment 1 of the present invention satisfies Conditions (1)–(3) above as set forth in Table 4 below.

TABLE 4

| Condition No. | Condition | Value |
|---|---|---|
| (1) | −3.4 < fl/fw < −3.0 | −3.29 |
| (2) | −1.6 < MT < −1.4 | −1.43 |
| (3) | 60 < v (G2+) | 69.9 |

Figure 2A:
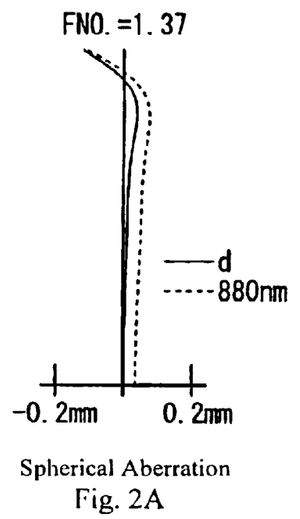
FIGS. 2A–2C show aberrations of Embodiment 1 of the zoom lens of the present invention at the wide-angle end.
Figure 2B:
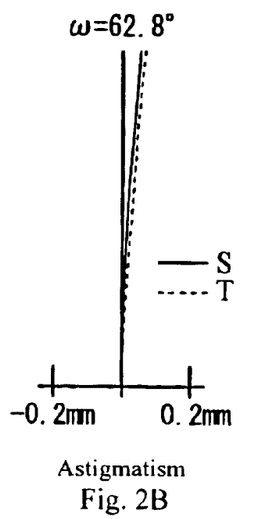
Figure 2C:
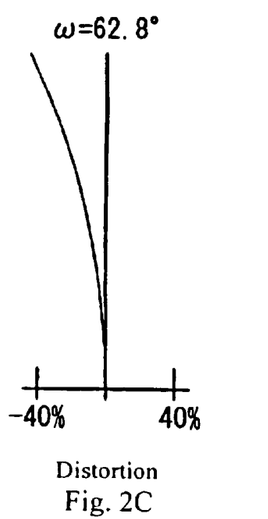
Figure 3A:
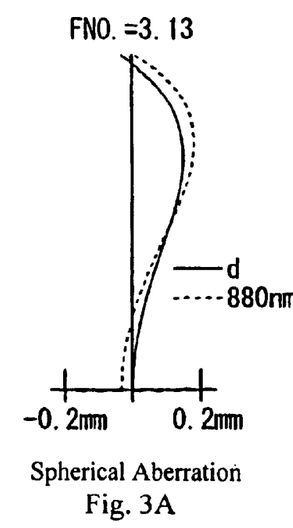
FIGS. 3A–3C show aberrations of Embodiment 1 of the zoom lens of the present invention at the telephoto end.
Figure 3B:
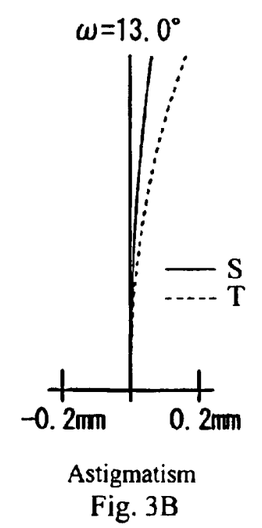
Figure 3C:
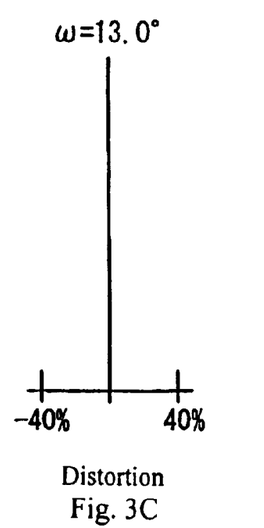

FIGS. 2A–2C show the spherical aberration, astigmatism, and distortion, respectively, of the zoom lens of Embodiment 1 at the wide-angle end. FIGS. 3A–3C show the spherical aberration, astigmatism, and distortion, respectively, of the zoom lens of Embodiment 1 at the telephoto end. In FIGS. 2A and 3A, the spherical aberration is shown for the wavelengths 587.6 nm (the d-line) and 880 run. In FIGS. 2B, 2C, 3B, and 3C, ω is the half-image angle. In FIGS. 2B and 3B, the astigmatism is shown for the sagittal image surface S and the tangential image surface T. In FIGS. 2C and 3C, distortion is measured at 587.6 nm (the d-line). As is apparent from these figures, the various aberrations are favorably corrected over the entire range of zoom.

EMBODIMENT 2

Embodiment 2 is very similar to Embodiment 1 and therefore only the differences between Embodiment 2 and Embodiment 1 will be explained. Embodiment 2 differs from Embodiment 1 in its lens element configuration such as different radii of curvature of lens surfaces, different eccentricities and aspheric coefficients of the aspheric lens surfaces, some different optical element surface spacings, some different refractive indexes, and some different Abbe numbers of the optical materials of the lens elements.

Table 5 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each lens element for Embodiment 2.

TABLE 5

| # | R | D | $N_d$ | $v_d$ |
|---|---|---|---|---|
| 1 | 25.31 | 1.00 | 1.81600 | 46.6 |
| 2 | 10.85 | 1.87 | | |
| 3 | 17.21 | 0.90 | 1.83480 | 42.7 |
| 4 | 7.82 | 4.65 | | |
| 5 | −22.36 | 0.90 | 1.71299 | 53.8 |
| 6 | 42.97 | 0.10 | | |
| 7 | 19.10 | 2.55 | 1.84665 | 23.8 |
| 8 | −646.83 | D8 (variable) | | |
| 9* | 10.72 | 3.76 | 1.56867 | 58.2 |
| 10* | −44.54 | 0.10 | | |
| 11 | 19.59 | 0.80 | 1.84665 | 23.8 |
| 12 | 9.18 | 4.76 | 1.56907 | 71.3 |
| 13 | −14.66 | 0.10 | | |
| 14 | 10.26 | 0.80 | 1.60562 | 43.7 |
| 15 | 6.00 | 2.00 | | |
| 16 | ∞ | 5.00 | 1.51680 | 64.2 |

The lens surfaces with a * to the right of the surface number in Table 5 are aspheric lens surfaces, and the aspheric surface shape of these lens elements is defined using Equation (A) above.

Table 6 below lists the values of the constants K, $A_4$, $A_6$, $A_8$, and $A_{10}$ used in Equation (A) above for each of the aspheric surfaces indicated in Table 5. Aspheric coefficients that are not present in Table 6 are zero. An "E" in the data indicates that the number following the "E" is the exponent to the base 10. For example, "1.0E-02" represents the number $1.0 \times 10^{-2}$.

TABLE 6

| # | K | $A_4$ | $A_6$ | $A_8$ | $A_{10}$ |
|---|---|---|---|---|---|
| 9 | −0.57330 | 0.19034E−4 | 0.23758E−7 | 0.72354E−8 | −0.45433E−9 |
| 10 | 1.71610 | 0.22112E−3 | −0.12411E−5 | 0.50344E−7 | −0.10831E−8 |

In the zoom lens of Embodiment 2, both the first lens group GI and the second lens group G2 move during zooming. Therefore, the on-axis spacing D8 between the two lens groups changes with zooming. With zooming, the focal length, the back focus distance, and the f-number of the zoom lens also change. The back focus distance is defined as the on-axis distance between the image-side surface of the cover glass Lc and the image plane Simg, as shown in FIGS. 1A–1B. Table 7 below lists the values of the variable D8 (in mm), the f-number $F_{NO}$, and the back focus distance Bf (in mm) at the wide-angle end (f=2.89 mm) and the telephoto end (f=13.71 mm).

TABLE 7

| f | D8 | $F_{NO}$ | Bf |
|---|---|---|---|
| 2.89 | 35.54 | 1.38 | 4.60 |
| 13.71 | 3.48 | 3.10 | 18.30 |

The zoom lens of Embodiment 2 of the present invention satisfies Conditions (1)–(3) above as set forth in Table 8 below.

TABLE 8

| Condition No. | Condition | Value |
|---|---|---|
| (1) | −3.4 < fl/fw < −3.0 | −3.33 |
| (2) | −1.6 < MT < −1.4 | −1.42 |
| (3) | 60 < v (G2+) | 64.8 |

Figure 4A:
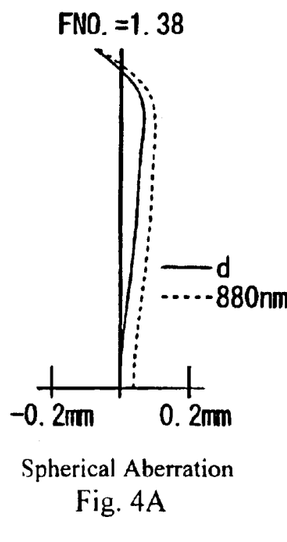
FIGS. 4A–4C show aberrations of Embodiment 2 of the zoom lens of the present invention at the wide-angle end.
Figure 4B:
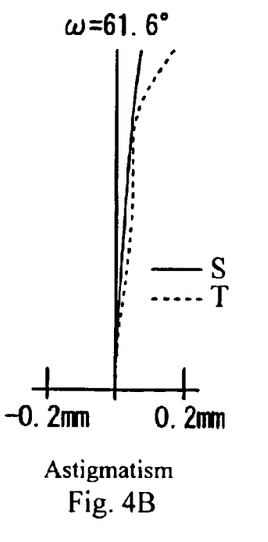
Figure 4C:
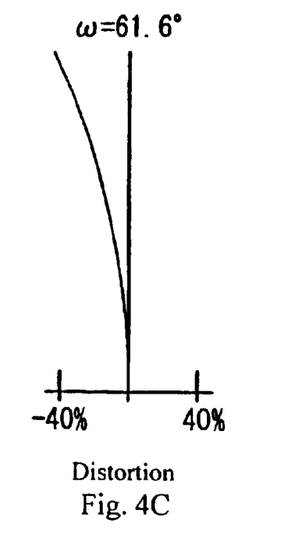
Figure 5A:
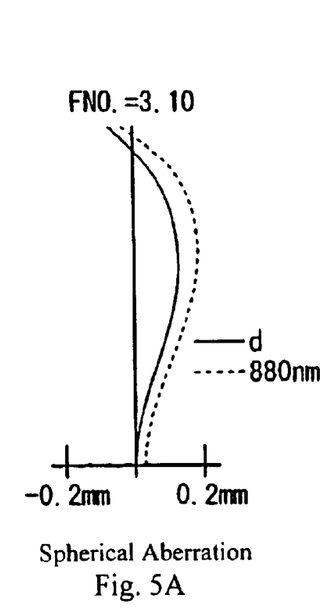
FIGS. 5A–5C show aberrations of Embodiment 2 of the zoom lens of the present invention at the telephoto end.
Figure 5B:
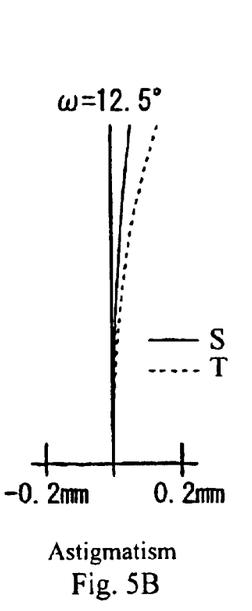
Figure 5C:
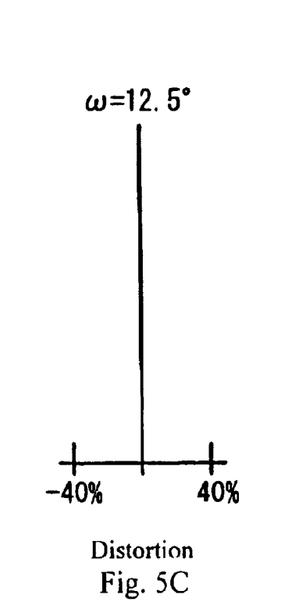

FIGS. 4A–4C show the spherical aberration, astigmatism, and distortion, respectively, of the zoom lens of Embodiment 2 at the wide-angle end. FIGS. 5A–5C show the spherical aberration, astigmatism, and distortion, respectively, of the zoom lens of Embodiment 2 at the telephoto end. In FIGS. 4A and 5A, the spherical aberration is shown for the wavelengths 587.6 nm (the d-line) and 880 nm. In FIGS. 4B, 4C, 5B, and 5C, ω is the half-image angle. In FIGS. 4B and 5B, the astigmatism is shown for the sagittal image surface S and the tangential image surface T. In FIGS. 4C and 5C, distortion is measured at the d-line. As is apparent from these figures, the various aberrations are favorably corrected over the entire range of zoom.

EMBODIMENT 3

Embodiment 3 is very similar to Embodiment 1 and therefore only the differences between Embodiment 3 and Embodiment 1 will be explained. Embodiment 3 differs from Embodiment 1 in its lens element configuration such as different radii of curvature of lens surfaces, different eccentricities and aspheric coefficients of the aspheric lens surfaces, some different optical element surface spacings, some different refractive indexes, and some different Abbe numbers of the optical materials of the lens elements.

Table 9 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each lens element for Embodiment 3.

TABLE 9

| # | R | D | $N_d$ | $v_d$ |
|---|---|---|---|---|
| 1 | 24.57 | 1.00 | 1.77250 | 49.6 |
| 2 | 9.50 | 1.96 | | |
| 3 | 12.76 | 0.90 | 1.78589 | 44.2 |
| 4 | 7.73 | 4.88 | | |
| 5 | −26.56 | 0.90 | 1.77250 | 49.6 |
| 6 | 24.56 | 0.36 | | |
| 7 | 17.36 | 2.59 | 1.84665 | 23.8 |
| 8 | 427.90 | D8 (variable) | | |
| 9* | 10.26 | 3.76 | 1.56872 | 58.2 |
| 10* | −30.07 | 0.10 | | |
| 11 | 18.31 | 0.80 | 1.80609 | 33.3 |
| 12 | 6.57 | 5.81 | 1.56907 | 71.3 |
| 13 | −14.34 | 0.10 | | |
| 14 | 11.63 | 0.80 | 1.80609 | 33.3 |

TABLE 9-continued

| # | R | D | $N_d$ | $v_d$ |
|---|------|------|---------|------|
| 15 | 6.93 | 2.00 | | |
| 16 | ∞ | 5.00 | 1.51680 | 64.2 |

The lens surfaces with a * to the right of the surface number in Table 9 are aspheric lens surfaces, and the aspheric surface shape of these lens elements is defined using Equation (A) above.

Table 10 below lists the values of the constants K, $A_4$, $A_6$, $A_8$, and $A_{10}$ used in Equation (A) above for each of the aspheric surfaces indicated in Table 9. Aspheric coefficients that are not present in Table 10 are zero. An "E" in the data indicates that the number following the "E" is the exponent to the base 10. For example, "1.0E-02" represents the number $1.0 \times 10^{-2}$.

TABLE 10

| # | K | $A_4$ | $A_6$ | $A_8$ | $A_{10}$ |
|---|----------|------------|-------------|------------|-------------|
| 9 | −0.22504 | 0.83148E−4 | 0.24138E−6 | 0.10890E−7 | −0.30507E−9 |
| 10 | 1.70790 | 0.31979E−3 | −0.17342E−5 | 0.50208E−7 | −0.10097E−8 |

In the zoom lens of Embodiment 3, both the first lens group GI and the second lens group G2 move during zooming. Therefore, the on-axis spacing D8 between the two lens groups changes with zooming. With zooming, the focal length, the back focus distance, and the f-number of the zoom lens also change. The back focus distance is defined as the on-axis distance between the image-side surface of the cover glass Lc and the image plane Simg, as shown in FIGS. 1A–1B. Table 11 below lists the values of the variable D8 (in mm), the f-number $F_{NO}$, and the back focus distance Bf (in mm) at the wide-angle end (f=2.83 mm) and the telephoto end (f=13.38 mm).

TABLE 11

| f | D8 | $F_{NO}$ | Bf |
|-------|-------|------|-------|
| 2.83 | 34.37 | 1.36 | 3.60 |
| 13.38 | 3.64 | 3.07 | 17.09 |

The zoom lens of Embodiment 3 of the present invention satisfies Conditions (1)–(3) above as set forth in Table 12 below.

TABLE 12

| Condition No. | Condition | Value |
|---|---|---|
| (1) | −3.4 < fl/fw < −3.0 | −3.28 |
| (2) | −1.6 < MT < −1.4 | −1.44 |
| (3) | 60 < v (G2+) | 64.8 |

Figure 6A:
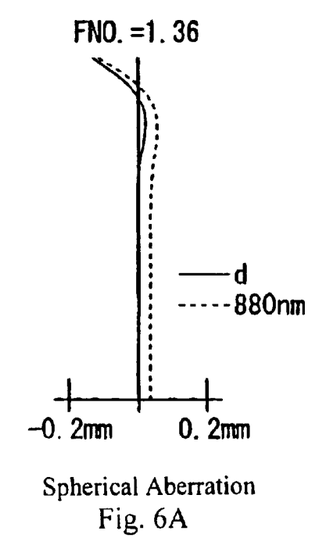
FIGS. 6A–6C show aberrations of Embodiment 3 of the zoom lens of the present invention at the wide-angle end.
Figure 6B:
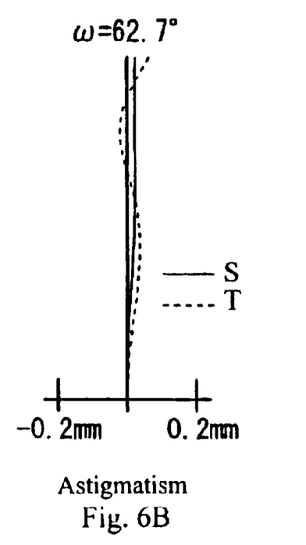
Figure 6C:
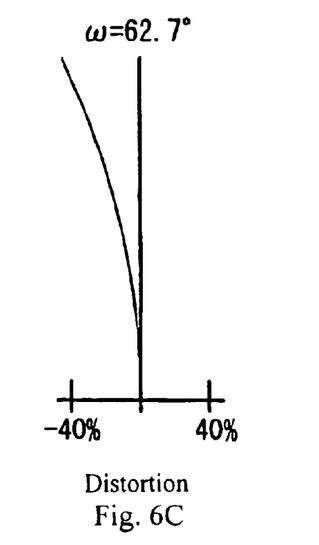
Figure 7A:
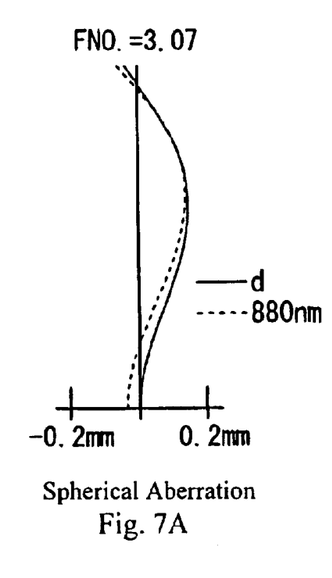
FIGS. 7A–7C show aberrations of Embodiment 3 of the zoom lens of the present invention at the telephoto end.
Figure 7B:
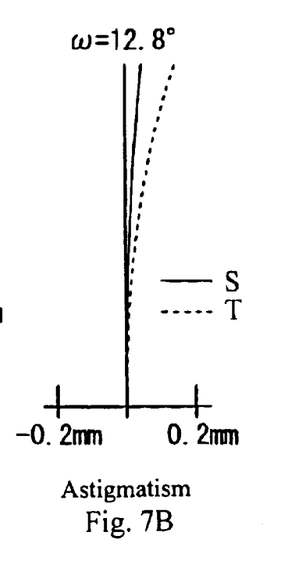
Figure 7C:
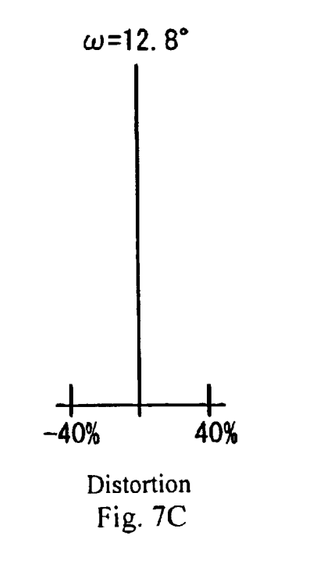

FIGS. 6A–6C show the spherical aberration, astigmatism, and distortion, respectively, of the zoom lens of Embodiment 3 at the wide-angle end. FIGS. 7A–7C show the spherical aberration, astigmatism, and distortion, respectively, of the zoom lens of Embodiment 3 at the telephoto end. In FIGS. 6A and 7A, the spherical aberration is shown for the wavelengths 587.6 nm (the d-line) and 880 nm. In FIGS. 6B, 6C, 7B, and 7C, ω) is the half-image angle. In FIGS. 6B and 7B, the astigmatism is shown for the sagittal image surface S and the tangential image surface T. In FIGS. 6C and 7C, distortion is measured at the d-line. As is apparent from these figures, the various aberrations are favorably corrected over the entire range of zoom.

EMBODIMENT 4

Embodiment 4 is very similar to Embodiment 1 and therefore only the differences between Embodiment 4 and Embodiment 1 will be explained. Embodiment 4 differs from Embodiment 1 in its lens element configuration by different radii of curvature of lens surfaces, different eccentricities and aspheric coefficients of the aspheric lens surfaces, and some different optical element surface spacings, some different refractive indexes, and some different Abbe numbers of the optical materials of the lens elements.

Table 13 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each lens element for Embodiment 4.

TABLE 13

| # | R | D | $N_d$ | $v_d$ |
|-----|--------|--------------|---------|------|
| 1 | 16.27 | 1.00 | 1.77250 | 49.6 |
| 2 | 8.57 | 4.40 | | |
| 3 | 18.14 | 0.90 | 1.75500 | 52.3 |
| 4 | 7.53 | 4.12 | | |
| 5 | −24.55 | 0.90 | 1.71299 | 53.8 |
| 6 | 18.63 | 0.58 | | |
| 7 | 15.89 | 2.44 | 1.84665 | 23.8 |
| 8 | 339.19 | D8 (variable) | | |
| 9* | 10.06 | 3.76 | 1.56867 | 58.2 |
| 10* | −30.75 | 0.10 | | |
| 11 | 18.32 | 0.80 | 1.80609 | 33.3 |
| 12 | 7.15 | 5.50 | 1.49700 | 81.5 |
| 13 | −12.18 | 0.10 | | |
| 14 | 11.25 | 1.29 | 1.80517 | 25.4 |
| 15 | 6.93 | 2.00 | | |
| 16 | ∞ | 4.00 | 1.51680 | 64.2 |

The lens surfaces with a * to the right of the surface number in Table 13 are aspheric lens surfaces, and the aspheric surface shape of these lens elements is defined using Equation (A) above.

Table 14 below lists the values of the constants K, $A_4$, $A_6$, $A_8$, and $A_{10}$ used in Equation (A) above for each of the aspheric surfaces indicated in Table 13. Aspheric coefficients that are not present in Table 14 are zero. An "E" in the data indicates that the number following the "E" is the exponent to the base 10. For example, "1.0E-02" represents the number $1.0 \times 10^{-2}$.

TABLE 14

| # | K | $A_4$ | $A_6$ | $A_8$ | $A_{10}$ |
|---|---|---|---|---|---|
| 9 | −0.24710 | 0.41001E−4 | 0.10856E−5 | 0.22189E−7 | −0.80602E−9 |
| 10 | 1.70270 | 0.28103E−3 | 0.15442E−6 | 0.39607E−7 | −0.13615E−8 |

In the zoom lens of Embodiment 4, both the first lens group G1 and the second lens group G2 move during zooming. Therefore, the on-axis spacing D8 between the two lens groups changes with zooming. With zooming, the focal length, the back focus distance, and the f-number of the zoom lens also change. The back focus distance is defined as the on-axis distance between the image-side surface of the cover glass Lc and the image plane Simg, as shown in FIGS. 1A–1B. Table 15 below lists the values of the variable D8 (in mm), the f-number $F_{NO}$, and the back focus distance Bf (in mm) at the wide-angle end (f=2.56 mm) and the telephoto end (f=12.08 mm).

TABLE 15

| f | D8 | $F_{NO}$ | Bf |
|---|---|---|---|
| 2.56 | 32.90 | 1.36 | 4.21 |
| 12.08 | 4.24 | 3.10 | 18.43 |

The zoom lens of Embodiment 4 of the present invention satisfies Conditions (1)–(3) above as set forth in Table 16 below.

TABLE 16

| Condition No. | Condition | Value |
|---|---|---|
| (1) | −3.4 < f1/fw < −3.0 | −3.08 |
| (2) | −1.6 < MT < −1.4 | −1.53 |
| (3) | 60 < ν (G2+) | 69.9 |

Figure 8A:
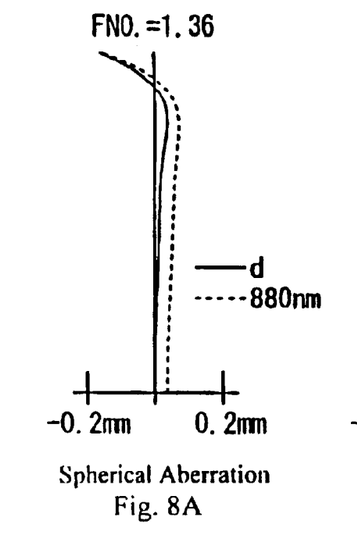
FIGS. 8A–8C show aberrations of Embodiment 4 of the zoom lens of the present invention at the wide-angle end.
Figure 8B:
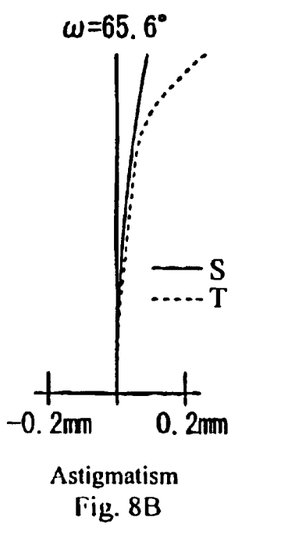
Figure 8C:
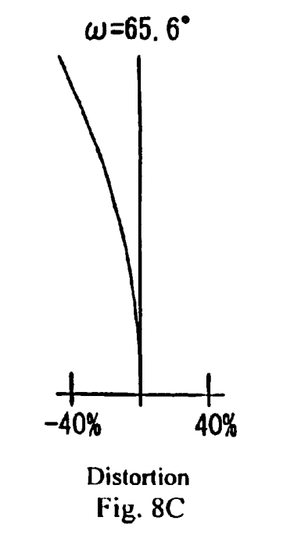
Figure 9A:
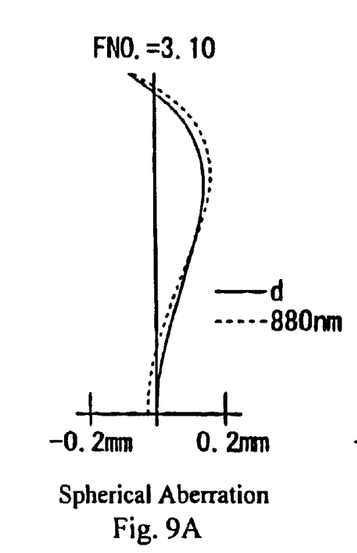
FIGS. 9A–9C show aberrations of Embodiment 4 of the zoom lens of the present invention at the telephoto end.
Figure 9B:
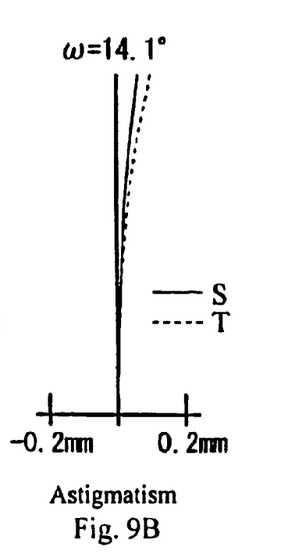
Figure 9C:
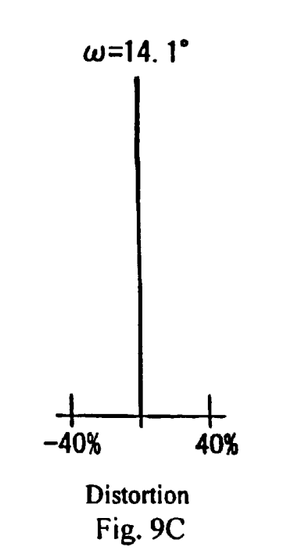

FIGS. 8A–8C show the spherical aberration, astigmatism, and distortion, respectively, of the zoom lens of Embodiment 4 at the wide-angle end. FIGS. 9A–9C show the spherical aberration, astigmatism, and distortion, respectively, of the zoom lens of Embodiment 4 at the telephoto end. In FIGS. 8A and 9A, the spherical aberration is shown for the wavelengths 587.6 nm (the d-line) and 880 nm. In FIGS. 8B, 8C, 9B, and 9C, ω is the half-image angle. In FIGS. 8B and 9B, the astigmatism is shown for the sagittal image surface S and the tangential image surface T. In FIGS. 8C and 9C, distortion is measured at the d-line. As is apparent from these figures, the various aberrations are favorably corrected over the entire range of zoom.

As can be understood from the descriptions and Tables above considered with the above described Figures, zoom lenses of Embodiments 1–4 of the present invention realize a higher zoom ratio (of about 4.7) than conventional two-group zoom lenses. Further, favorable aberration correction can be achieved in the visual and the near infrared regions.

The present invention is not limited to the aforementioned embodiments, as it will be obvious that various alternative implementations are possible. For instance, values such as the radius of curvature R of each of the lens components, the surface spacings D, the refractive index N, as well as the Abbe number ν, are not limited to the examples indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens formed of only two lens groups, arranged along an optical axis in order from the object side as follows:

a first lens group having negative refractive power; and a second lens group having positive refractive power;

wherein the first and second lens groups are moved along the optical axis during zooming, and the following conditions are satisfied:

$-3.4 < f1/fw < -3.0$ $-1.6 < MT < -1.4$ $60 < v(G2+)$ where f1 is the focal length of the first lens group, fw is the focal length of the two-group zoom lens at the wide-angle end, MT is the lateral magnification of the second lens group at the telephoto end of the zoom range of the two-group zoom lens, and v(G2+) is the average of the Abbe numbers of the materials of the lens elements having positive refractive power of the second lens group.

2. The zoom lens of claim 1, wherein at least one lens surface of at least one lens element of the second lens group is aspheric.

3. The zoom lens of claim 1, wherein:

the first lens group includes, arranged along the optical axis in order from the object side, a first lens element of negative refractive power and a meniscus shape with its convex surface on the object side, a second lens element having a meniscus shape, a third lens element having a biconcave shape, and a fourth lens element of positive refractive power; and the second lens group includes, arranged along the optical axis in order from the object side, a first lens component of positive refractive power, a lens element of negative refractive power that is intimately bonded to a lens element of positive refractive power so as to form a second lens component, and a third lens component of negative refractive power and a meniscus shape with its convex surface on the object side.

4. The zoom lens of claim 3, wherein the first lens group consists of four lens elements.

5. The zoom lens of claim 4, wherein the second lens group consists of three lens components.

6. The zoom lens of claim 5, wherein each of the first lens component of the second lens group and the third lens component of the second lens group consists of a single lens element, and the second lens component of the second lens group consists of the two intimately bonded lens elements of positive and negative refractive power.

7. The zoom lens of claim 3, wherein the second lens group consists of three lens components.

8. The zoom lens of claim 7, wherein each of the first lens component of the second lens group and the third lens component of the second lens group consists of a lens element, and the second lens component of the second lens group consists of the two intimately bonded lens elements of positive and negative refractive power.

9. The zoom lens of claim 2, wherein:
the first lens group includes, arranged along the optical axis in order from the object side, a first lens element of negative refractive power and a meniscus shape with its convex surface on the object side, a second lens element having a meniscus shape, a third lens element having a biconcave shape, and a fourth lens element of positive refractive power; and
the second lens group includes, arranged along the optical axis in order from the object side, a first lens component of positive refractive power, a lens element of negative refractive power that is intimately bonded to a lens element of positive refractive power so as to form a second lens component, and a third lens component of negative refractive power and a meniscus shape with its convex surface on the object side.

10. The zoom lens of claim 9, wherein the first lens group consists of four lens elements.

11. The zoom lens of claim 10, wherein the second lens group consists of three lens components.

12. The zoom lens of claim 11, wherein each of the first lens component of the second lens group and the third lens component of the second lens group consists of a lens element, and the second lens component of the second lens group consists of the two intimately bonded lens elements of positive and negative refractive power.

13. The zoom lens of claim 9, wherein the second lens group consists of three lens components.

14. The zoom lens of claim 13, wherein each of the first lens component of the second lens group and the third lens component of the second lens group consists of a lens element, and the second lens component of the second lens group consists of the two intimately bonded lens elements of positive and negative refractive power.

15. The zoom lens of claim 1, wherein:
the first lens group includes, arranged along the optical axis in order from the object side, a first lens component of negative refractive power and a meniscus shape with its convex surface on the object side, a second lens component having a meniscus shape, a third lens component having a biconcave shape, and a fourth lens component of positive refractive power; and
the second lens group includes, arranged along the optical axis in order from the object side, a first lens component of positive refractive power, a lens element of negative refractive power that is intimately bonded to a lens element of positive refractive power so as to form a second lens component, and a third lens component of negative refractive power and a meniscus shape with its convex surface on the object side.

16. The zoom lens of claim 15, wherein the first lens group consists of four lens components.

17. The zoom lens of claim 16, wherein the second lens group consists of three lens components.

18. The zoom lens of claim 17, wherein each of the first lens component of the second lens group and the third lens component of the second lens group consists of a single lens element, and the second lens component of the second lens group consists of the two intimately bonded lens elements of positive and negative refractive power.

19. The zoom lens of claim 15, wherein the first lens group consists of four lens elements.

20. The zoom lens of claim 19, wherein the second lens group consists of three lens components.

* * * * *

UNITED STATES PATENT AND TRADEMARK OFFICE
CERTIFICATE OF CORRECTION

PATENT NO. : 6,917,477 B2
DATED : July 12, 2005
INVENTOR(S) : Takatsuki

It is certified that error appears in the above-identified patent and that said Letters Patent is hereby corrected as shown below:

Column 4,
Line 52, change "$\xi$ (G2+)" to -- $v$ (G2+) --.

Signed and Sealed this

Twenty-seventh Day of September, 2005

JON W. DUDAS
*Director of the United States Patent and Trademark Office*